United States Patent
Dave et al.

(10) Patent No.: US 7,112,384 B2
(45) Date of Patent: Sep. 26, 2006

(54) FUEL CELL MANIFOLD SEAL WITH RIGID INNER LAYER

(75) Inventors: Nileshkumar T. Dave, West Hartford, CT (US); Ning Lin, South Glastonbury, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 485 days.

(21) Appl. No.: 10/619,406

(22) Filed: Jul. 15, 2003

(65) Prior Publication Data

US 2005/0014058 A1    Jan. 20, 2005

(51) Int. Cl.
*H01M 6/00*    (2006.01)
*H01M 2/00*    (2006.01)
*H01M 2/02*    (2006.01)
*H01M 2/08*    (2006.01)

(52) U.S. Cl. .................. 429/35; 429/34; 29/623.2

(58) Field of Classification Search ............ None
See application file for complete search history.

(56) References Cited

U.S. PATENT DOCUMENTS 4,623,596 A * 11/1986 Kamoshita .................. 429/26
4,794,055 A    12/1988 Matsumura et al.

* cited by examiner

*Primary Examiner*—Patrick Joseph Ryan
*Assistant Examiner*—Julian Mercado
(74) *Attorney, Agent, or Firm*—M. P. Williams

(57) ABSTRACT

A multi-layer seal system for a manifold (10) of a proton exchange membrane fuel cell includes a silicone rubber filler layer (22) between endplates (9) to compensate for the uneven edges of cell elements, an elastomer gasket (15) disposed within a groove (24) in the contact surfaces of a manifold (10), and a rigid dielectric strip (40) coplanar with the contact surfaces (17) of the endplates (9) interposed between the silicone rubber filler layer (22) and the gasket (15). The rigid dielectric strip (40) may be either angled (40a) for a corner seal, or flat (40b).

6 Claims, 2 Drawing Sheets

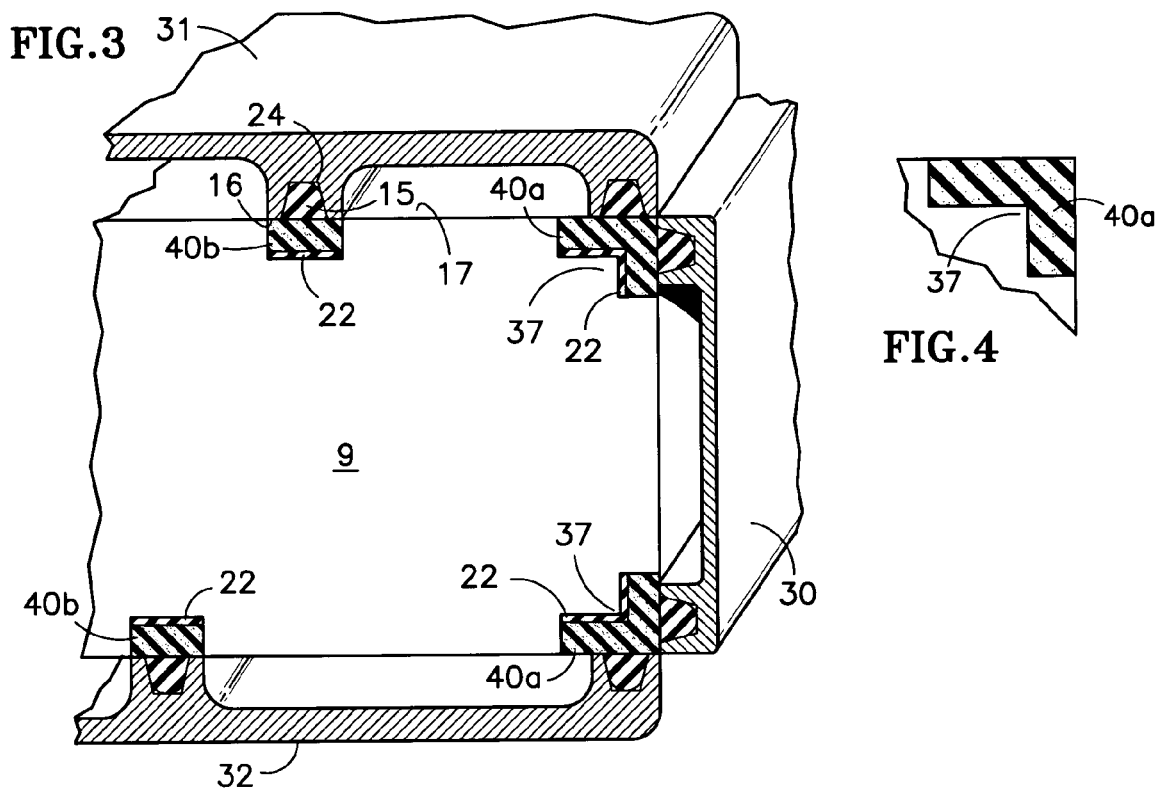
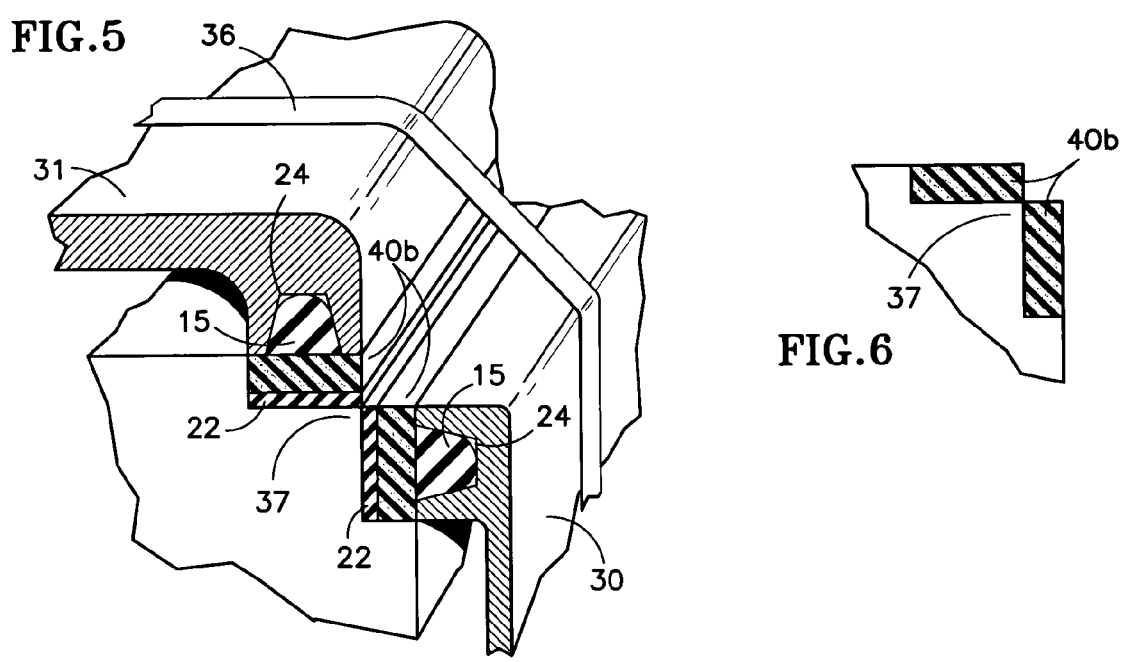

FUEL CELL MANIFOLD SEAL WITH RIGID INNER LAYER

TECHNICAL FIELD

This invention relates to a multi-layer reactant gas manifold seal having a rigid inner layer for sealing a proton exchange membrane (PEM) fuel cell manifold to a fuel cell stack assembly.

BACKGROUND ART

A basic fuel cell comprises an anode electrode spaced apart from a cathode electrode with an electrolyte disposed between the two electrodes; each electrode includes a catalyst layer on the electrolyte side thereof. On the non-electrolyte side of the anode electrode is a reactant gas chamber for carrying a fuel, and on the non-electrolyte side of the cathode electrode is a reactant gas chamber for carrying an oxidant. The electrodes are constructed so that the gas diffuses therethrough and comes into contact with the electrolyte in the catalyst layer thereby causing a well-known electrochemical reaction whereby hydrogen ions and electrons are produced at the anode. The electrons travel from the anode electrode through an external circuit to the cathode electrode where they react with oxygen to produce heat and water. This flow of electrons is the electric current produced by the cell.

In a proton exchange membrane (PEM) fuel cell power plant, a number of fuel cells are connected electrically in series, forming a cell stack assembly (CSA). The cells of the CSA are sandwiched between end plates bolted together to hold the cells in tight contact with one another.

Cell stack assemblies that utilize gaseous reactants typically have opposed pairs of external manifolds which distribute the reactant gases to the cells in the stack, and gather reactant exhaust gases from the cells in the stack, as disclosed for example in commonly owned U.S. patent application Ser. No. 09/920,914, (PCT publication number US 2003-0027029) Typically, the pairs comprise a fuel inlet/exit manifold opposite a fuel turn manifold and an air inlet manifold opposite an air outlet manifold. Each manifold must be sealed to the cell stack assembly to prevent leakage of the reactant gases into the ambient environment. A manifold retention system may include load cables to provide a manifold-to-CSA sealing force.

Generally, the dimensional tolerances of the individual cells and the position tolerances of the cells within the cell stack assembly result in cell edge misalignment, known as an uneven "skyline", within the PEM cell stack assembly.

Referring to FIG. 1, a typical prior art PEM fuel cell manifold-to-CSA seal arrangement, disclosed in commonly owned U.S. patent application Ser. No. 09/882,750, (PCT publication number US 2001-0055708-A1), is illustrated. Fuel cell elements 8, which together form an uneven skyline, are sandwiched between endplates 9 bolted together so as to hold the individual cells 8 in tight contact with one another. A reactant gas manifold 10 (either oxygen containing oxidizing gas or hydrogen containing fuel gas) is positioned adjacent the cell elements 8 so as to provide a flow of reactant gas to and from the CSA 35. The prior art seal system 13 includes one or more filler layers 22 of silicone liquid rubber applied to the skyline of the stack surface to form a flat relatively smooth surface above the elements 8, overlapping the sealing surfaces 17 on the endplates 9. A molded silicone rubber gasket 15 is bonded to a contact surface 16 of the manifold 10. The gasket 15 is used in conjunction with a flat rubber strip 20, typically a molded precast silicone rubber strip, interposed between the silicone rubber filler layer 22 and the gasket 15.

When subject to a sealing force between the manifold 10 and CSA 35, the layers of sealing materials, 20, 22 and 15, compress to form a tight seal. Even when compressed, however, the intervening layers of sealing materials result in a necessary clearance 24 between contact surfaces 16 and 17 of the manifold 10 and endplates 9 respectively.

Although well suited for stationary fuel cell power plant applications, such manifold-to-CSA seals disclosed in the prior art have certain limitations when used in automobiles or other vehicles subject to the stresses of acceleration and vibration. In particular, the seals may experience compressive creep over time, which reduces the sealing force exerted by the load cables, and can result in reactant leakage and slipping of the seals. Moreover, the rubber strip 20, between the gasket 15 and the silicone rubber filler 22 transfers the compressive forces on the seal to the cell stack assembly non-uniformly and may result in cracked cell components 8 at the high spots in the skyline.

DISCLOSURE OF INVENTION

Objects of the invention include provision of:

a rigid, flat, level sealing surface between manifold and CSA to minimize leakage caused by compressive creep;

an even load distribution to the CSA seal area in order to reduce the loading concentration on skyline high spots that can cause cracking of the cell components; and enhanced seal durability to meet vehicular CSA requirements.

According to the present invention, a manifold seal system for a fuel cell comprises at least three parts, including a first seal part of elastomer filler applied to the uneven skyline of the cell stack assembly between opposite endplates, the elastomer filler being any compatible elastomer such as a silicone rubber, a room temperature vulcanizing (RTV) rubber, and an ultraviolet curable elastomer, a second seal part comprising an elastomer gasket disposed within a groove in the contact surface of the manifold, and a third seal part comprising a rigid dielectric strip interposed between the first and second seal parts; the rigid strip being seated in a coplanar relationship with the contact surfaces of the endplates to form a sealing surface of the cell stack assembly, the three seal parts dimensioned so that facing surfaces of the manifold and the endplates (or coplanar rigid strip) are in direct contact with each other when the manifold is secured to the cell stack assembly under the proper design load.

Although it is preferable for the manifold seal system of the present invention to comprise at least three parts, it need not. In another aspect of the present invention, the manifold contact surface need only be in direct contact with a rigid sealing surface of a fuel cell stack assembly.

In yet another aspect of the present invention, the manifold seal system includes a rigid dielectric strip at the interface between a manifold contact surface and a corresponding sealing surface of a fuel cell stack assembly.

The cross section of the rigid dielectric strip may form a corresponding angle to enclose a corner of the cell stack assembly or, alternatively, the cross section of the rigid strip may be flat.

The present invention provides an effective seal between the manifold and the cell stack assembly, particularly for vehicular applications where the seal is subject to the forces of acceleration and vibration.

Other objects, features and advantages of the present invention will become more apparent in the light of the following detailed description of exemplary embodiments thereof, as illustrated in the accompanying drawings.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 3 is a partial perspective view of a first embodiment of the manifold seal of the present invention.

FIG. 4 is a cross section of a first embodiment of the rigid strip used in a corner seal of the present invention.

FIG. 5 is a close up view of a corner section of the second embodiment.

FIG. 6 is a cross section of the second embodiment of the rigid strips used in a corner seal of the present invention.

MODE(S) FOR CARRYING OUT THE INVENTION

Figure 1:
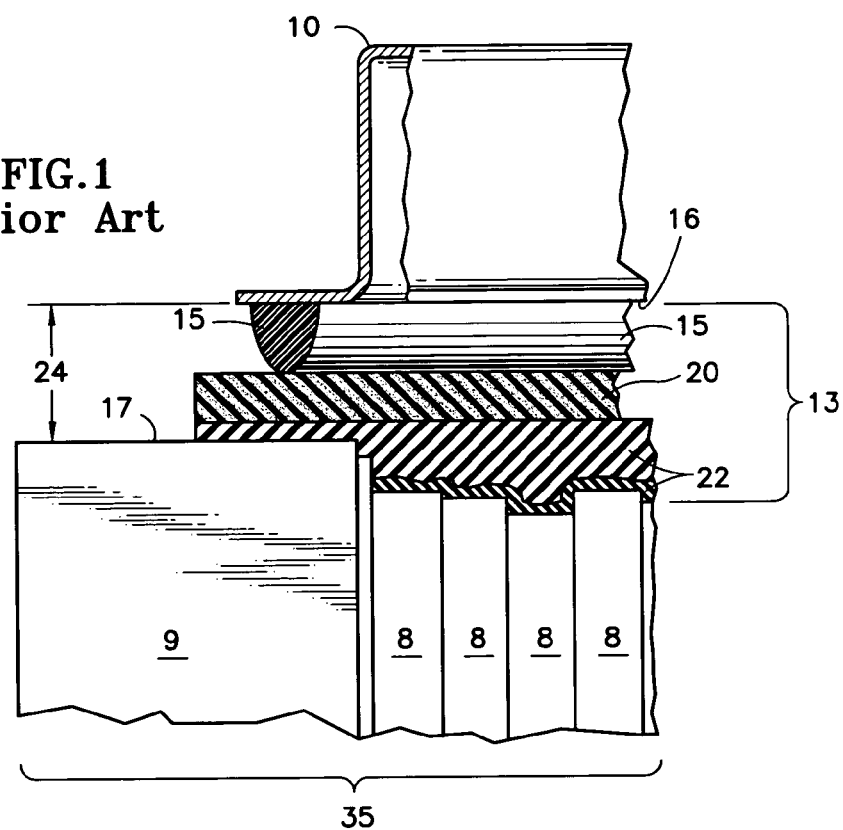
FIG. 1 is a partial, partially broken away and sectioned, front elevation view of a fuel cell having a prior art seal configuration.
Figure 2:
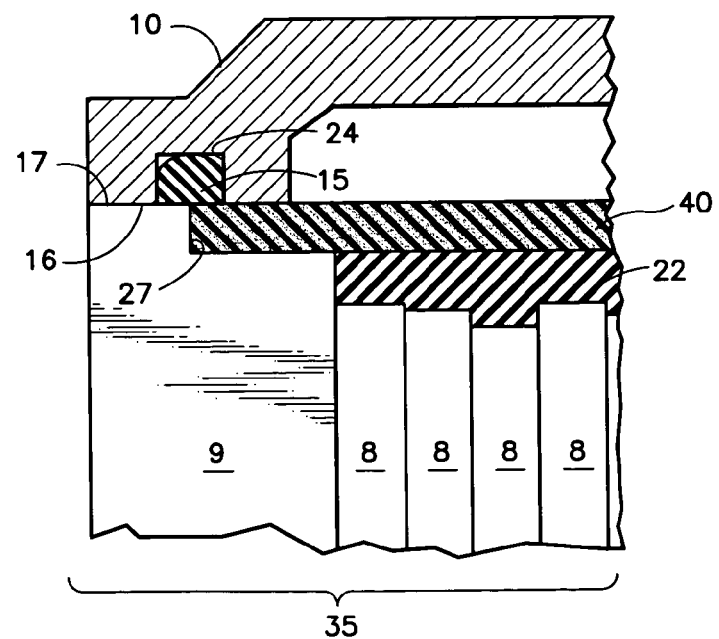
FIG. 2 is a partial, partially broken away and sectioned, front elevation view of a fuel cell having a seal according to the present invention.

Referring to FIG. 2, a reactant gas manifold 10 is positioned above a cell stack assembly 35 having an uneven skyline. At least one silicone rubber filler layer 22, such as GE RTV 118, Shin Etsu KE3476T, or any compatible elastomer, is applied to the surface of the skyline to form a relatively flat, smooth surface above the cells 8.

Endplate 9 of the present invention includes a notch 27 to receive an end portion of a rigid dielectric strip 40 coplanar with the contact surface 17 of the endplates 9 and extending over the CSA sealing area to spread the sealing load uniformly. The rigid strip 40 may be adhesively secured to the skyline silicone rubber filler layer 22 and on the notch surfaces of the endplates 9. In order to prevent shorting of the cells 8, the rigid strip 40 must be a dielectric, such as a NEMA G11 fiberglass reinforced plastic, or a polymer-coated metal. Other dielectric composite materials or metallic materials with a dielectric coating, known to those skilled in the art, may also be used to form the rigid strip 40.

In FIG. 2, manifold 10 includes a groove 24 formed on the contact surface 16 thereof to hold a molded silicone rubber gasket 15 or equivalent compatible elastomer, that may be either pushed in place or molded into the groove 24. It is an important aspect of the present invention that the groove 24 and the molded gasket 15 be dimensioned such that the contact surface 16 of the manifold 10 and the sealing surface of the CSA, (including the contact surface 17 of endplates 9 and coplanar surface of the rigid strip 40) have a substantially zero clearance when the proper design load is applied by the load cables 36, (see FIG. 5) or other manifold attachment system. The elimination of a clearance between rigid surfaces 16 and 17 results in a much more stable seal and a constant sealing load that substantially reduces compressive creep. The multi-layer manifold seal of the present invention may be used advantageously with any PEM fuel cell manifold, including both fuel and oxidant inlet, exit and turn manifolds, in stationary, portable and vehicular PEM fuel cell applications.

In a first embodiment of the present invention, shown in FIGS. 3 and 4, molded elastomer gaskets 15 are partially recessed into grooves 24 in the contact surface of the manifold. Rigid strips 40a and 40b are adhesively secured to a layer of silicone rubber filler 22 and are coplanar with the surface 17 of endplates 9 such that when the proper design load on the load cables 36 (see FIG. 5) is applied, contact surface 16 of the manifold is in direct contact with the corresponding sealing surface of the cell stack assembly. In this first embodiment, the rigid inner layer of the manifold seal at the corners 37 of the CSA is an angled strip 40a enclosing the corner 37. As used herein, "angled" means having a cross section conforming to the shape of the corner or other nonlinear edge of the cell stack assembly to be sealed. In this first embodiment the angled strip 40a has a generally L-shaped cross section as shown in FIG. 4. The angled strip 40a tends to force any fuel leakage from the fuel manifold 30 into the adjacent air manifolds 31 and 32 so that, advantageously, the fuel either reacts on the cathode catalyst or is vented in the high volume air exhaust stream.

In an alternative embodiment, illustrated in FIGS. 5 and 6, the rigid inner layer of the manifold seal at the corners 37 of the CSA comprise two flat strips 40b at right angles to each other. The corner configuration using flat strips 40b is shown in cross section in FIG. 6.

The aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell assembly having a plurality of fuel cell component elements extending under compressive pressure between a pair of endplates to form a cell stack assembly, and having a reactant gas manifold, said elements having mutually uneven surfaces at ends thereof to which said manifold is to be sealed, and having a first seal part comprising at least one type of elastomer applied to said mutually uneven surfaces;

characterized by the improvement comprising:

a groove disposed within a contact surface of said manifold for receiving an elastomer gasket;

a notch extending from a surface of each of said endplates for receiving an end portion of a rigid strip coplanar with said end plate surface to form a sealing surface of said stack assembly coextensive with and facing said manifold contact surface;

a second seal part comprising an elastomer gasket disposed within said groove of said manifold; and a third seal part comprising a rigid dielectric strip interposed between said first seal part and said second seal part.

2. An assembly according to claim 1 wherein said rigid strip is an angled corner strip.

3. An assembly according to claim 1 wherein said rigid strip is flat.

4. An assembly according to claim 1 wherein said rigid strip comprises a fiberglass reinforced plastic.

5. An assembly according to claim 1 wherein said rigid strip comprises a polymer-coated metal.

6. A method of sealing a contact surface of a reactant gas manifold to endplates and fuel cell component elements of a fuel cell stack assembly comprising:
(a) forming a groove in the contact surface of said manifold;
(b) providing an elastomer gasket disposed within said groove;
(c) providing a notch in a surface of said end plate for receiving a rigid dielectric strip coplanar with said endplate surfaces to form a sealing surface of said stack assembly;
(d) applying at least one layer of an elastomer to the regions of said fuel cell elements that are to be sealed to said manifold to provide a surface which is relatively smooth and flat;
(e) adhering a rigid dielectric strip to said elastomer layer; and
(f) installing said manifold on said fuel cell stack assembly such that its entire contact surface is in direct contact with said sealing surface of said stack assembly, said rigid strip being between said manifold and said elastomer layer.

* * * * *